July 8, 1958  J. JACKSON  2,841,865
METHOD OF FORMING BODIES
Filed May 20, 1954

INVENTOR.
BY James Jackson
ATTORNEY

United States Patent Office 2,841,865
Patented July 8, 1958

2,841,865

METHOD OF FORMING BODIES

James Jackson, Tulsa, Okla.

Application May 20, 1954, Serial No. 431,096

2 Claims. (Cl. 29—421)

This invention relates to a method of forming and more particularly, but not limited thereto, to a method of forming spherical and semi-spherical bodies adapted to be assembled into pressure containers for use in the storage and transportation of liquids under pressure, such as liquefied petroleum gases and other volatile liquids and non-condensible gases.

At the present time, spherical tanks and other arcuately shaped bodies are commonly fabricated by welding together in edge to edge relationship a multiplicity of die-shaped individual segments of a sphere, wherein the sphere is formed by mechanical dies, or the placement of the work piece in a die and hydraulic pressure is forced against the work piece, thereby causing the work piece to be elongated and shaped into the configuration of the die. It will be apparent that such procedures involve a considerable time and expense in the forming of the segments, positioning them and welding them to cause the spherical body. In all previous methods using die operations, reliance is placed upon the elongation and stretching of the material over the die or into the crevices of a die which has definite pressure limitations. In the use of upper and lower dies for forming, there is a limitation of force in order to prevent the edges of the work piece from crumbling by too great an application of force. Similarly, in the forming of automobile hub caps and other arcuately and similarly shaped bodies, the use of a hydraulic pressure forced against the work piece placed in a die causes the work piece to be elongated. Furthermore, a limitation of force must be taken into consideration when hydraulic pressure is applied internally of a work piece because application of sufficient force to form the piece will, in most instances, cause a rupture thereof before forming.

The present invention is generally concerned with the forming of arcuately and spherically shaped bodies, and more particularly, but not limited, to spherical or similar shaped bodies for making pressure containers wherein a work piece of previously determined diameter and length is placed in a pair of cooperating dies and there is a simultaneous application of the die members and hydraulic pressure working internally in the work piece to cause a forming of the work piece without materially elongating or thinning the material, thickening it or causing ruptures or breaks, or causing any material difference in the physical properties of the steel material being used, thereby providing a simultaneous combination of mechanical and hydraulic means for the forming operation.

It is an important object of this invention to provide a novel method of forming arcuately or spherical shaped bodies by combining the mechanical and hydraulic pressures working simultaneously against the body.

And still another object of this invention is to provide a method of forming spherical or similar shaped work pieces through the application of mechanical pressure externally of the work piece simultaneous with the application of hydraulic pressure internally of the work piece.

And still another object of this invention is to form a spherical or similar shaped body by the combined application of mechanical and hydraulic pressure applied simultaneously at opposite sides of the body in order to prevent any substantial elongation of the material, ruptures, or cause any material changes in the physical properties of the body material.

And still another object of this invention is to form a spherical or similar shaped body from a pre-formed body of substantially cylindrical shape in cross-section by the application of combined mechanical and hydraulic pressures simultaneously working from opposite sides of the body in order to minimize breakage, or rupturing of the body during the forming operation and without appreciable thinning of the material.

And still another object of this invention is to form a spherical or similar shaped body from a pre-formed work piece of substantially cylindrical shape in cross-section by applying combined hydraulic and mechanical die pressure simultaneously at opposite sides of the work piece, thereby effecting considerable economy in the cost of material and expediting the forming thereof.

Other objects and advantages of the invention will be evident from the following detailed description, read in conjunction with the accompanying drawings, which illustrate my invention.

Figure 1:
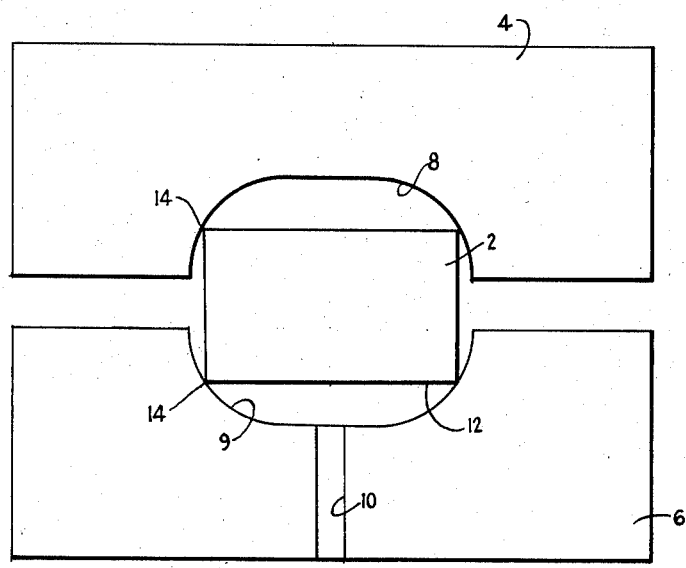
Figure 1 is a vertical sectional view showing the work piece disposed between the cooperating die members.
Figure 2:
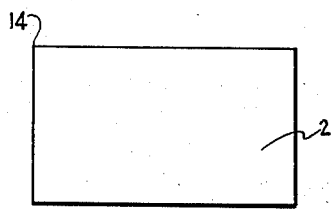
Figure 2 is an elevational view of the cylindrical work piece.

Referring to the drawings in detail, the longitudinal cylindrical section 2 shown in Fig. 2 is of a pre-determined dimension formed from flat stock in a manner set forth in the patent to Raymond J. Branson, No. 2,628,418, issued February 17, 1953, particularly where it is desired to obtain balance between plastic deformation in tension and in compression during forming, the raw material is cut to size substantially in accordance with the following generalized formulae. If flat stock is used, the rectangular dimensions prior to rolling and forming into a cylindrical section are as follows:

$$\text{Width} = \frac{\text{pi} \times D \times \text{arc sine } W/D}{180}$$

$$\text{Length} = \frac{180\ W}{\text{arc sine } W/D}$$

Where D is the diameter of the finished spherical body, W is the length of the longitudinal chord of the expanded body, and arc sine W/D is the angle, expressed in degrees, the sine of which is W/D.

If the segment or cylinder is to be formed from a section of tubing or pipe rather than flat stock, the length of the cylindrical section is determined by the above "width" formula, and the diameter is the above "length" formula divided by "pi" (3.1416) as follows:

$$\text{Tubing or pipe diameter} = \frac{180\ W}{\text{pi} \times \text{arc sine } W/D}$$

As was set forth in the above mentioned patent, the plastic deformation in tension (elongation) caused during a forming operation is to be counter-balanced by deformation in compression, which results in a distribution between the two types of deformation. It will be apparent from the above formulae that the size of the longitudinal segment as shown is dependent upon the length of the chord relative to the diameter and is predetermined for optimum widths and lengths.

The pre-formed cylinder 2 is placed between a pair of cooperating upper and lower dies 4 and 6, respectively, adapted to be utilized with any suitable type of hydraulic press or other forming apparatus (not shown). The upper die 4 is formed with a curved radius portion 8 and the lower die 6 is formed with a similar curved radius portion 9 adapted to modify the corners of the complete cylinder work piece 2 into a substantially spherical piece in a manner as will be hereinafter set forth. The lower die 6 is provided with a centrally disposed passageway 10 for receiving hydraulic or fluid pressure through suitable inlet conduits (not shown). The hydraulic or fluid pressure is discharged into the interior of the cylindrical work piece 2 through its lower open end 12.

Operation

Figure 3:
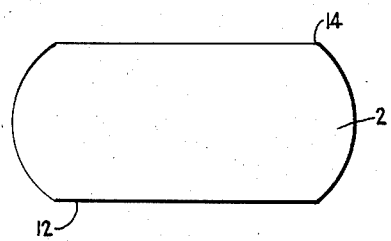
Figure 3 is an elevational view of the work piece after forming.

With the dies 4 and 6 placed in a hydraulic press, or other suitable forming machine and having the work piece 2 carried therein, it becomes apparent that movement of the dies toward each other will provide an edge reduction of the cylindrical work piece at the corners 14 due to the arcuate contour of the radius portions 8 and 9. Simultaneous with the compression movement of the die members, and the compression and edge reduction of the corners 14 of the work piece, the internal pressure is applied against the interior of the work cylinder 2. Consequently, when the dies 4 and 6 are compressing the cylindrical work piece to cause movement of the molecules of the metal structure therein, there is a simultaneous reaction of the hydraulic force providing a simultaneous movement of metal for the remaining portion of the cylindrical work piece other than at the corners and edges 14 thereof. In this process, there is provided a dual or two opposing forces working simultaneously to form the cylinder in substantially the shape of a spherical section or the like. It will be apparent that the spherical shape of the formed section 2 in Fig. 3 is the middle section of a spherically shaped tank or pressure container. The action of an upper and lower member working against the work piece with simultaneous opposing force energy forms the spherical or similar shaped section from the cylindrical work piece without materially elongating or thinning or thickening the material or causing ruptures or breaks during the forming operation or causing material change in the physical properties of the material utilized, such as steel and the like.

During the forming operation of the work piece, the simultaneous action of the cooperating forces precludes any thinning or elongation of the metal from a cylindrical shape to a partially spherical shape, since all the metal is in motion at once and thereby prevents any appreciable thinning in the middle of the work piece, or thickening at the edges thereof. In this manner, the metal in the work piece substantially retains its original characteristic of elasticity.

From the foregoing, it will be apparent that the present invention provides a combined application of opposite force energies against a cylindrical work piece to cause a spherical or similar shaped body formed thereof without any rupture or breaks during the forming operation and substantially eliminating elongation or change in the physical properties in the material as formed. Furthermore, the forming operation with the opposite force energies effects economies in the material used and expedites the forming operation thereof.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. The method of forming a substantially spherical shaped body which consists of placing a pre-formed cylindrical shaped work piece having open ends between upper and lower die members having an internal recess of an arcuately shaped contour, compressing the die members against the work piece to reduce the diameter of the open ends thereof, simultaneously directing hydraulic pressure directly to the interior of the work piece for application against the opposite side thereof to cause the metal to flow to substantially the contour of the dies.

2. The method of forming a partially spherical shaped body which consists of placing a cylindrical shaped work piece of predetermined dimensions and having open ends between upper and lower die members, each having an internal recess of an arcuately shaped contour, moving the die members simultaneously for compression against the work piece to substantially reduce the diameter of the open ends thereof simultaneously with compression of the die members applying a hydraulic pressure directly to the interior of the work piece to cause the metal to flow to substantially the contour of the dies.

References Cited in the file of this patent

UNITED STATES PATENTS

| | | |
|---|---|---|
| 788,119 | Pope | Apr. 25, 1905 |
| 2,459,316 | Gramelspacher | Jan. 18, 1949 |

FOREIGN PATENTS

| | | |
|---|---|---|
| 435,263 | Germany | Oct. 12, 1926 |